Patented Sept. 27, 1932

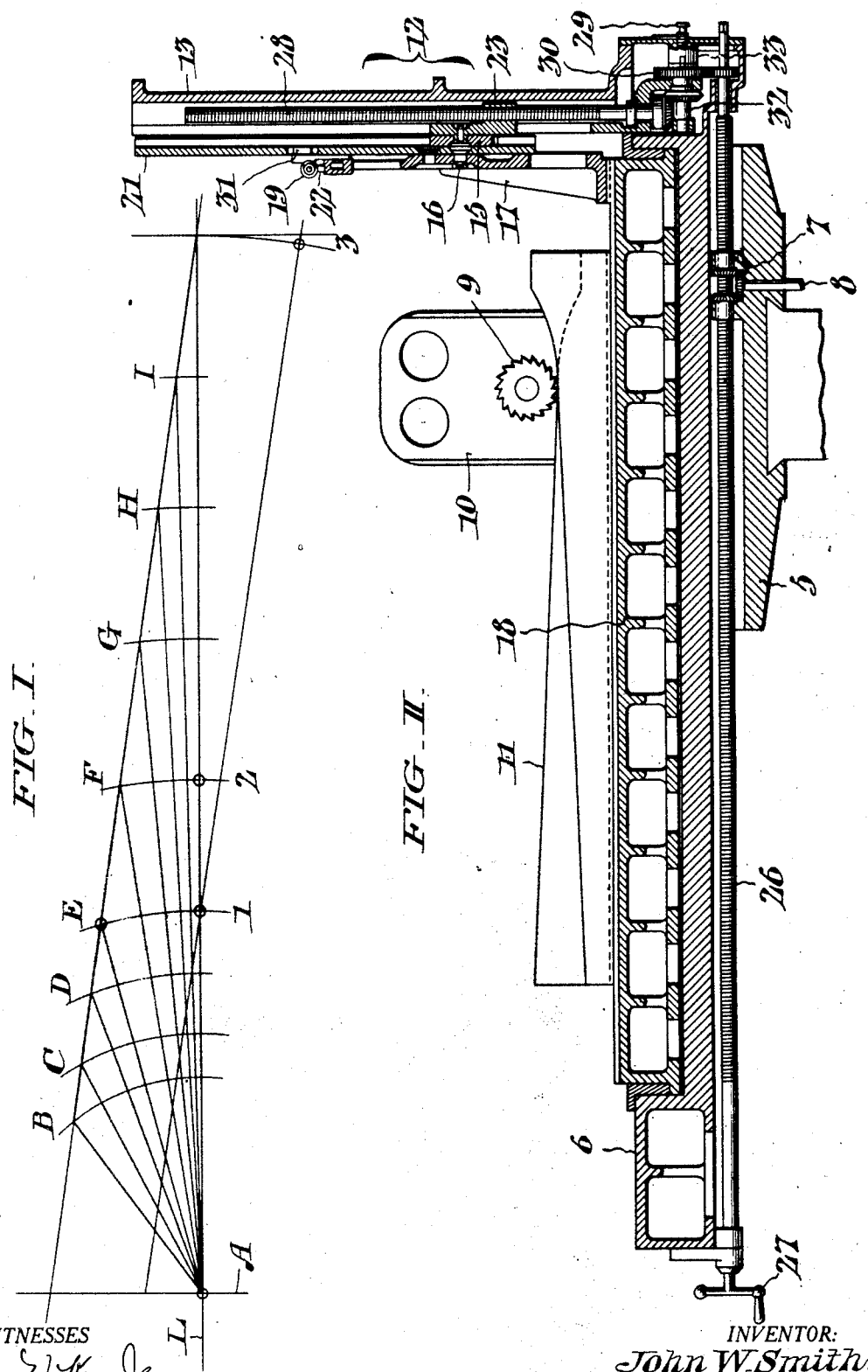

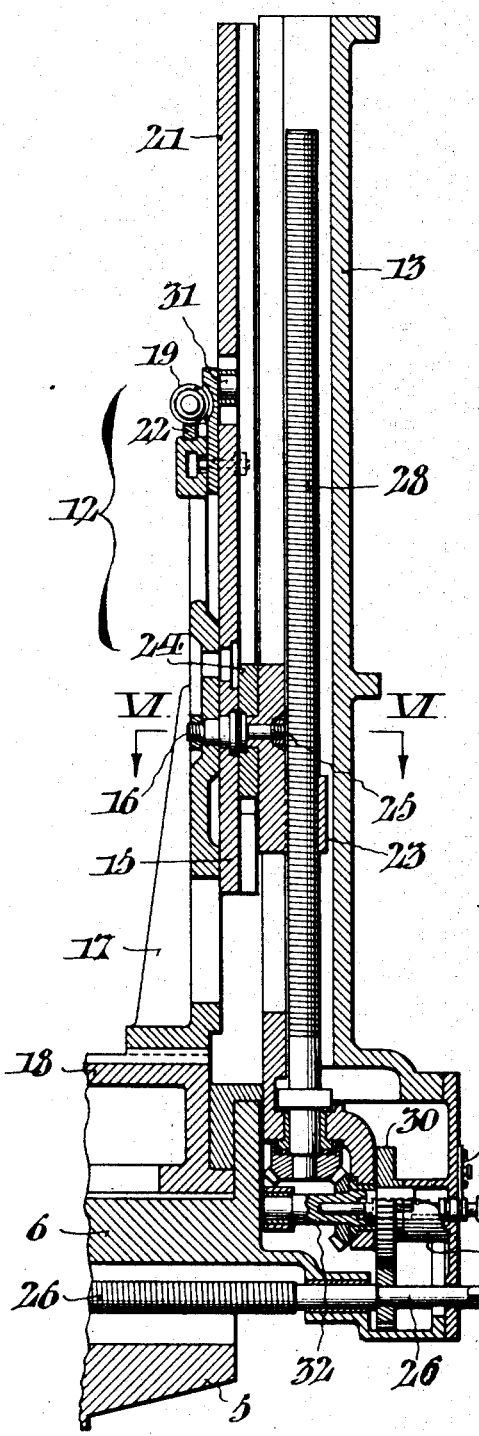
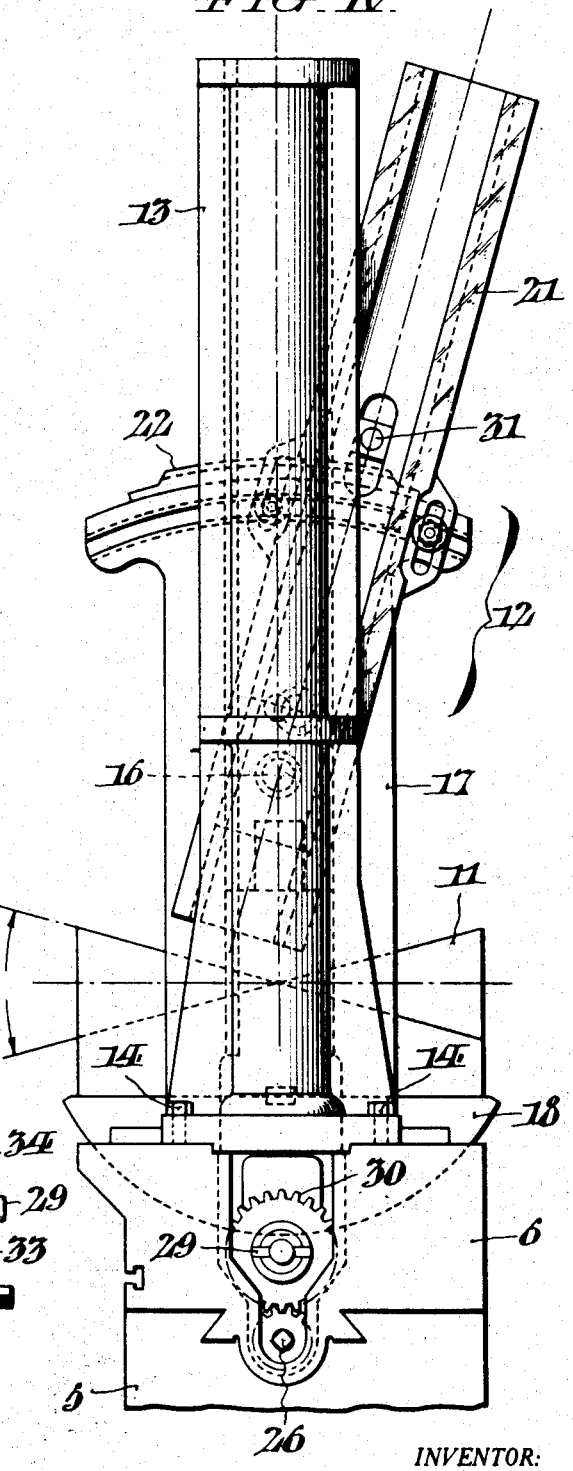

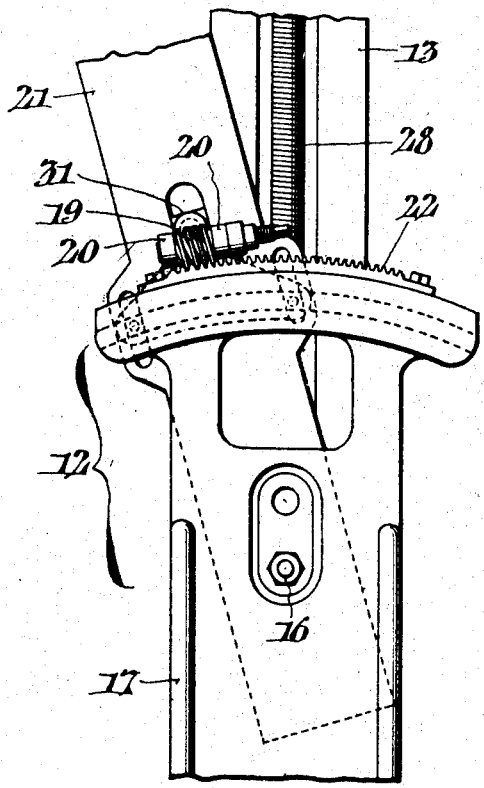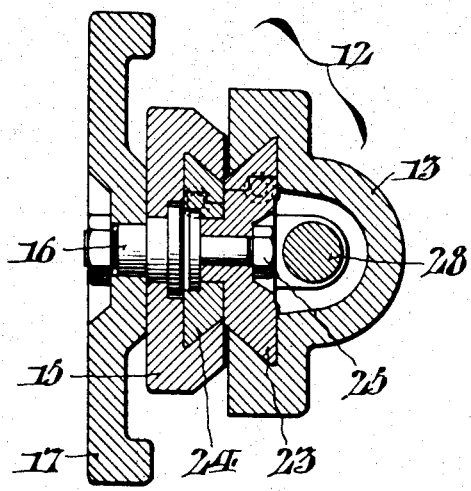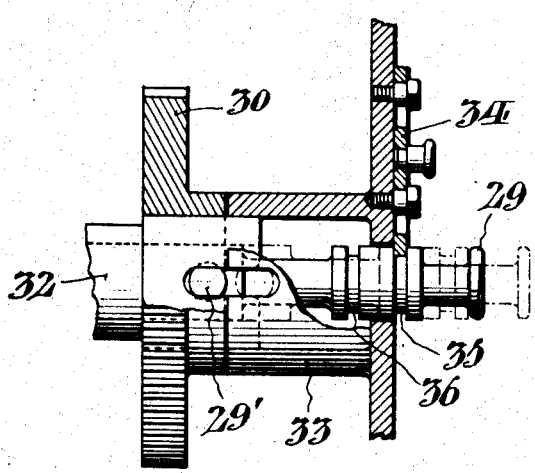

1,879,566

UNITED STATES PATENT OFFICE

JOHN W. SMITH, OF PHILADELPHIA, PENNSYLVANIA

MEANS FOR MILLING SURFACES REQUIRING A UNIFORM SCREW PITCH

Application filed June 4, 1929. Serial No. 368,208.

This invention relates to means or mechanism for milling, or otherwise machining, die block faces or cavities requiring a uniform screw pitch surface, such as is essential to the production of aeronautical propellers, for example.

The primary object of this invention is the provision of mechanism capable of the two automatic movements, necessary to generation of the requisite pitch needful in the fabrication of aeronautical screw propellers.

Three straight line fundamental movements are employed to generate a variable rotary movement such as required for the screw pitch used in aeronautical propellers, by arranging a pair of co-operating slides, one tangential to the axis of rotation, and the other arranged radial to the axis of rotation. One of the slides being securely fastened to the rotating member, and the other securely fastened to the non-rotating member. In other words, the required movement for generating an irregular curve on a die block face is effected by straight line movements of two sliding shoes fitted into a straight line guide, the straight line movements of said two shoes being adapted to generate an irregular curved face.

In the accompanying drawings I have illustrated a typical means adapted to my invention.

Fig. I is a conventional diagram graphically representing the required pitch for aeronautical propellers.

Fig. II is a sectional view of a mechanism whereby the two movements may be secured by screw or rack-and-pinion means.

Fig. III is a sectional view, to a somewhat larger scale, of the means functional to produce the radial movement.

Fig. IV is a face view looking toward the left hand of Fig. III, with a cover member removed from the lower portion thereof.

Fig. V is a fragmentary view looking toward the right hand of Fig. III, and of the upper medial portion thereof.

Fig. VI is a sectional view taken on the plane indicated by the arrows VI—VI on Fig. III; and, Fig. VII is an enlarged part elevation and part sectional view of a clutching means hereinafter explained.

Referring firstly to Fig. I of the accompanying drawings, L is the base line from which the angles are made, while the vertical line A represents the center of rotation for the propeller; whereas, B, C, D, E, F, G, H and I, inclusive, indicate pitch angles for the propeller blade.

As a typical example, the pitch generating mechanism shown by Figs. II–VII, inclusive, has been "set" to make use of the angle at station 1, and zero angle at station 3. Stations 1 and 3 must, therefore, represent a predetermined distance and angle along the base line L from the focus point A, which indicates the center of rotation for the propeller blade.

For convenience in setting the machine station 1, has been selected for the zero setting and station 3, as that for setting the required angles. Provision has been made, however, in the illustrated mechanism, for using station 2, as a setting station.

In actual practice, station 1 has been conveniently located eighteen (18) inches from the center of the propeller hub, with station 3 forty-eight (48) inches from said hub center, and station 2 twenty-four (24) inches therefrom.

Referring more particularly to Fig. II it is to be remarked that I have therein shown a broken portion 5 of a conventional milling machine having a horizontally movable table 6 under control of an appropriate automatic drive 7, actuated from a pinion shaft 8, so that said table may be traversed in either direction relative to the milling tool or cutter 9 supported by the cutter head 10.

It is furthermore, noteworthy, that the die block 11, to be machined is positioned on the table 6, to show the cutting tool 9 as located at station 1 relative to said die block, as well as at station 1 on the pitch generating mechanism, comprehensively designated 12.

The pitch generating mechanism 12 comprises a grooved element 13 that is securely fastened, as by screw bolts 14, to the milling machine table 6, and said element affords guidance for a vertically movable slide 15. Passing into the slide 15 is the pitch control pivot 16 that is afforded bearing by a bracket 17, securely fastened upon the oscillatory table 18; while said slide 15 is adjustable by means of a worm 19 rotatably mounted in bearings 20, on a plate member 21 rockably supported on the control pivot 16, above referred to. The worm 19 meshes with a rack segment 22 conveniently—although not essentially—mounted on the bracket 17, and it will be readily seen that by rotating said worm the plate member 21 may be turned clock-or-counterclock-wise on the pivot 16, within the limits of said rack segment, as desired.

Vertical guidance for the slide 15 relative to the grooved element 13 is afforded by means of a shoe 23, pivotally journaled in an opposing shoe 24 having a movable fit in the slide 15 aforesaid, said parts being retained in operative relation by means of a clamp screw 25, in an obvious manner.

Horizontal feed screw 26 has been turned by hand wheel 27 to place the table 6 in the required position to suit the zero setting 1, on the die block 11.

The vertical feed screw 28 of the pitch generating mechanism 12, which threadedly passes through the shoe 23, having been turned to locate the pitch control pivot 16 at the zero station 1, and a clutch pin 29 having a pin 29'—Fig. VII—engageable with the gear 30; hence any further movement of the horizontal feed screw 26 will effect a co-ordinate movement of the vertical feed screw 28. Furthermore, it will be apparent that, when the screws 26, 28 are clutched as just set forth, they generate a compound movement of the die block 11 relative to the cutter 9 which produces the predetermined or "set" pitch; or, in other words, a uniform horizontal movement is made use of with a co-operating variable rotary movement to generate the desired pitch. Furthermore the pitch angle for any desired set up is obtained by shifting the pivot 31 in the plate member 21, by means of the worm 19.

The straight portion of the die block 11 is conveniently machined by withdrawing the clutch pin 29 from engagement with the gear 30 thus locking the pinion shaft 32 against rotation by engaging said clutch pin with the stationary element 33, as clearly understandable from Fig. VII. The horizontal screw 26 may now be rotated while the vertical screw 28 is locked stationary, thus making it possible to machine any straight surface of the die block 11. Furthermore the clutch pin 29 is held in place by a latch 34 when engaging the gear 30 for rotary movement, and locates position when engaging the stationary element 33 for locking position; while annular grooves 35, 36 in said pin provide the two locating positions for engagement by the latch 34.

Obviously the die block 11 may be removed and a suitable chuck substituted for holding propeller blades, whereby the operation above set forth may be readily performed thereon.

Having thus described my invention, I claim:

1. A pitch generating mechanism for machining die blocks and other surfaces requiring a variable twist comprising a vertical member mounted on a horizontally movable support, an adjustable slide guided by the vertical member affording pivotal support for a relatively oscillatory member, a pitch control pivot engaged with the slide and afforded bearing by a stationary element on the oscillatory member, said slide having a path of movement passing through the axis of the pitch control pivot, an element pivotally co-ordinated to the slide and capable of rocking movement relative to the pitch control pivot in a plane at right angles to the oscillatory member aforesaid, and means to effect uniform co-operative movements of the slide and pivotal element while progressing the article being machined.

2. A pitch generating mechanism for machining die blocks and other surfaces requiring a variable twist, such as aeronautical propellers, comprising a horizontally movable support, a vertical member on said support with means affording pivotal bearing for an oscillatory table, a straight line slide guided by the vertical member, a pitch control pivot engaged in the slide, said slide having a path of movement passing through the axis of the pitch control pivot, a straight line plate element pivotally coordinated to the slide and capable of swinging movement with respect to the pitch control pivot in a plane at right angles to the oscillatory table aforesaid, the plate element aforesaid being pivotally sustained by a bracket securely fastened to the oscillatory table and the vertical member rigidly secured to the horizontal movable support, and automatic means to effect co-pending co-operative movements of the slide and plate element while traversing the article being machined.

3. A pitch generating mechanism for machining die blocks and other surfaces requiring a variable twist comprising a member mounted on a movable support at right angles thereto, an adjustable slide guided by the member and affording pivotal connection for a relatively oscillatable member, a pitch control pivot in the slide while afforded bearing by a stationary bracket on the oscillatable member, said slide having a path of movement through the axis of the pitch control pivot, an element pivotally-coordinated to the slide and capable of swinging movement in a plane at right angles to the oscillatable member, and means to effect uniform horizontal progression of the movable support with variable co-pending vertical-and-rotary movement of the slide to generate the desired pitch.

In testimony whereof, I have hereunto signed my name at Philadelphia, Pennsylvania, this 1st day of June, 1929.

JOHN W. SMITH.